Patented Feb. 7, 1939

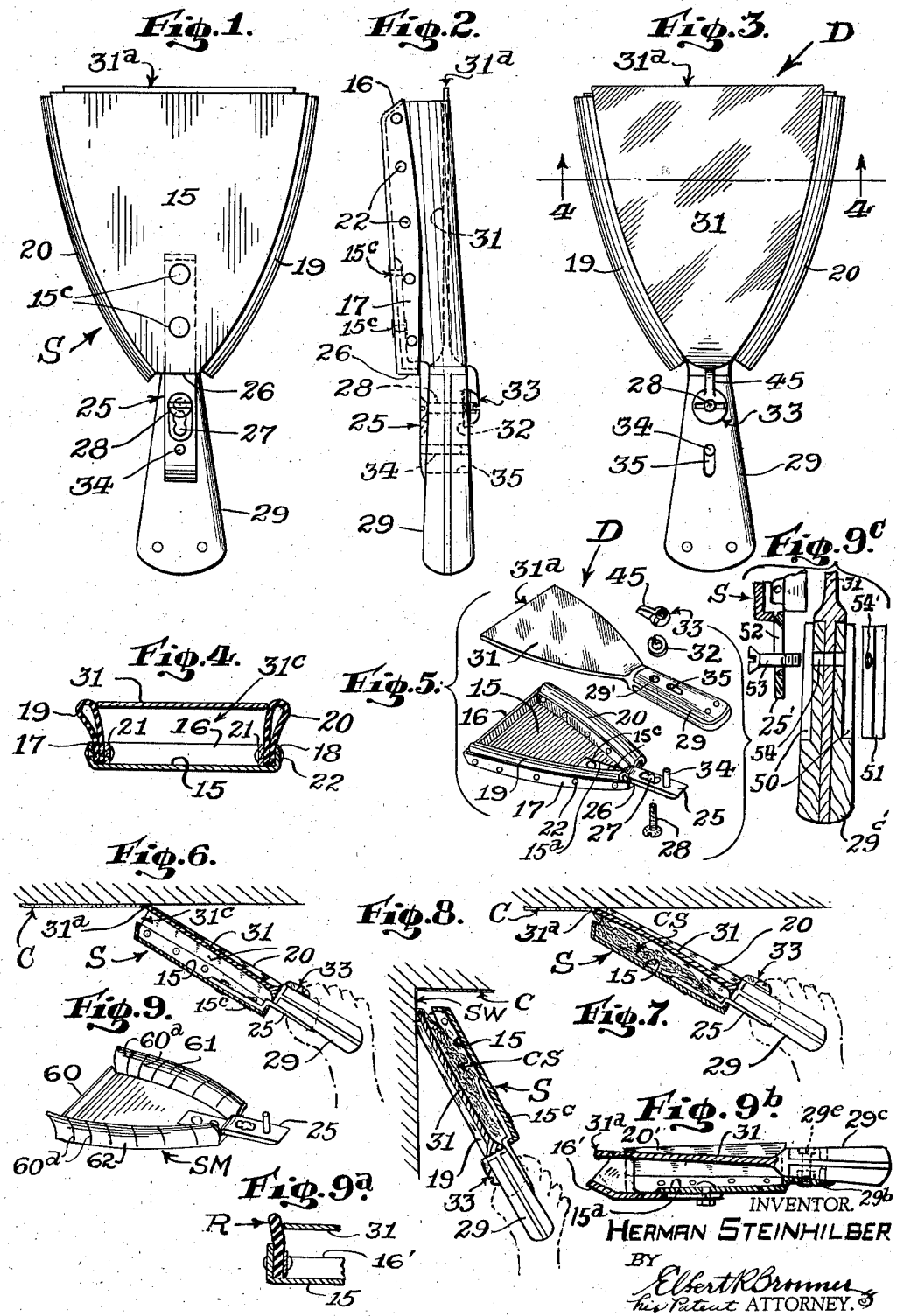

2,146,317

UNITED STATES PATENT OFFICE 2,146,317

SCOOPER ATTACHMENT FOR SCRAPERS

Herman Steinhilber, Whitestone, Long Island, N. Y.

Application January 10, 1938, Serial No. 184,119

1 Claim. (Cl. 30—136)

My invention relates to a scooper-attachment device, which is readily secured onto a scraping tool or knife, such as those used for scraping off calcimine, and its purpose is to collect the scrapings into a box-like device as the knife cuts away the calcimine, the device being dipped into water for washing out the scrapings from the box-like chamber, when the scooper is again ready for further scraping, and so on at intervals for a long continuous job.

A salient feature of my invention, is that the knife of the scraper or knife, may be reversed, so the scraping or cutting edge is always kept fit for operation, as the scraping wears down the blade edge bevel-like, when it may be reversed so the sharp edge is used for scraping or cutting until it becomes dull again when it is reversed again and so on, the blade continually sharpening itself. If necessary, the blade edge may be sharpened or squared up on a wet or oil stone, or the like, whenever preferred. Adjustment means is provided whereby the blade's scraping or cutting edge is always in advance of the upturned flared end or beveled edge and opening between the box-like scooper and the scraping blade, this adjustment being accomplished by graduated holes and one locking screw, or in a slotted portion, if so desired, when the extension bracket is secured to the scraper's handle, which is also slotted for the anchor pin 34, which however may be eliminated, as later to be described.

Another salient feature of my invention, is the resilient side walls of my box-like receptacle, onto which the side edges of the scraper's blade bear during the scraping operations, the flared end portion of the blade bending under the pressure necessary for the scraping or cutting of the calcimine, so in order that the boxed-in-chamber is secured tight or leak proof. At the same time the elongated opening into which the scrapings enter as it is being cut away, is reduced slightly smaller, which prevents any possible scrapings falling to the floor. This elongated opening and cutting edge of the knife are working close enough so the cutting away strip or scrapings are always entering there through into the enclosed chamber of the scooper as the knife advances rapidly in its scraping operation.

It is readily seen that my scooper-attachment is a very handy and practical device, and from tests in experimenting so far has proven itself a time and labor saving device, besides being a benefactor in cleanliness, whereby no scrapings are falling around on the floor, furniture coverings, or the operator himself, and this is quite important, as calcimine or plaster scrapings do make a nasty mess.

Other features of my invention will appear as the following description proceeds in the specification, reference being made to the drawing, in which Figure 1 is an exterior view of my scooper-device, shown attached to a scraping tool or scraper.

Figure 2 is a side or end view of Figure 1.

Figure 3 is a view similar to Figure 1, showing the scraping blade of the knife seated into my box-like scooper.

Figure 4 is a cross sectional view on a slightly reduced scale over Figure 3, of the box-like chamber of the scooper and scraping knife taken on line 4—4 of Figure 3.

Figure 5 is an exploded view of my scooper-attachment device, showing the parts ready to be assembled onto the scraping tool or scraper.

Figure 6 is a sectional view of my scooper-attachment and scraper shown ready to start scraping, as on a ceiling.

Figure 7 is a similar view of the same scooper and scraper shown in its scraping operation.

Figure 8 is a similar view as Figure 7, showing my scooper-device scraping onto a side wall and near the corner thereof.

Figure 9 is a perspective view similar to the scooper shown in Figure 5 but this being an alternative view of an integral metal box-like scooper.

Figure 9a is a fragmentary sectional view of solid rubber side walls.

Figure 9b is a view similar to Fig. 7, but showing a modified form of scooper made in two pieces and bolted together.

Figure 9c is a sectional view of the scooper's end showing an exploded view in perspective of an alternative means to secure the scooper-box to the knife, whereby a smooth finish handle is provided.

Referring to the drawing, the letter S designates my box-like scooper having a bottom 15 with upturned end 16 shown obliqued or beveled, and sides 17 and 18, onto which are secured resilient members 19 and 20, made of for example, of inner tube rubber looped in a double layer as shown in Figure 4, but may be made of solid rubber as shown in Figure 9a, as indicated at R, or of any suitable material to accomplish the same purpose. These resilient members are held by clamping strips 21 and rivets 22 to the side metal walls 17 and 18, or in any other suitable manner. An extension member or bracket 25 is secured, such as by rivets 15c, to the bottom 15 of the box-like scooper S, and protrudes outwardly as shown in Figure 5, from the reduced end portion 26, of the scooper S, and is provided with adjustment holes 27 which may be a slot, through which a screw 28 is inserted and into the hole 29' of the handle 29 of the scraper or knife D, and a lock-washer 32 and lock-nut 33 tightly secures the screw 28 therewith. A dowel or anchor pin 34 is for the purpose of insuring the rigidity of the attaching arrangement, and the slotted hole 35 in the handle 29, is for the adjustment of the anchor or fulcrumed pin 34, when the scooper is set or pivotally adjusted in the holes or slot 27, due to the wearing of the cutting or scraping edge 31a of the blade 31. However, this anchor pin is optional, if other means is used.

A knob 45 is shown on the lock-nut 33, so in event of the inconvenience of having a spanner or screw driver handy, the wing portion of the knob will produce means to loosen the lock-nut readily so the scraper D may be quickly reversed for the new cutting edge during a long continuous scraping job. It is quite essential the grip portion of the extention bracket 25 and handle 29 offers little obstruction, such as sharp corners or edges, and means to do this will be adopted, if so desired, such as to be described later. The end 16 and the blade 31 adjacent the cutting edge 31a, provides an elongated opening 31c through which the scrapings SC enter during the scraping operation.

It is to be noted that the blade 31 with a straight scraping edge is of a symmetrical type, that is, it is uniform so when it is reversed from one scraping position to another, it fits the same on the rubber cushioned side walls or seats. A scraping tool or knife having a slightly raised or pitched scraping edge may be used, if so desired, but if it is slightly offset, my scooper-attachment will be made accordingly, but in this instance, the blade cannot be reversed, but is removed for sharpening the scraping edge. However, a pitched or beveled edge may be made for a symmetrical blade, in such an event, it may therefore be reversed.

In Figure 9, I show an all metallic scooper-attachment SM, made of, for example, spring steel, or of any suitable anti-rust material, the end 60 being free from the integral resilient side walls, slitted as shown at 60a, to have the same cushion effect for the blade 31 to depress itself thereon as the rubber walls 19 and 20, during the scraping operation.

In Figure 9a, a fragmentary view of one side of my scooper-attachment device is shown, provided with a solid rubber side wall R in place of the looped cushions 19 and 20, or these resilient walls may be any similar material, if so desired.

In Figure 9b, the end 16' is shown part of the box-like member 15a with rubber sides (19" and 20" not shown), which eliminates the adjusting means on the handle 29c of the scraping tool S as shown in Figures 1 to 3, to allow for the wearing away of the edge 31a of the blade 31. A bracket-clamping member 29b and a screw 29e secures the box-like member 15a of this scooper-attachment to the metal shank of the handle 29c. This upturned end 16' is shown beveled or obliqued, same as the end 16 as hereintobefore described in the original scooper, so the operation of swishing or rinsing the scooper-device in a pail of water every three or four scrapings, will allow for the flushing the scrapings out of the scooper more so than if it was at a right angle or having square corner like. However, this beveled or obliqued end must not be too much, as the scrapings may fall out during the scraping operations.

In Figure 9c, I show an alternative attaching means, in which the handle 29c is recessed out as shown at 50, to receive a filler plate 51 and the bracket 25' of the scooper S, which is adjustable by the slot 52, and the screw 53 which extends through the hole 54 in the handle 29c, and is secured thereat in hole 54' of the filler plate 51. These parts may be reversed from one side to the other, when the knife or scraper S is reversed.

It is understood I may adopt other means than shown in the drawing and hereinbefore described such as in the adjusting means, and the fastening or attaching means of box-like members to the handle of the scraper D, or in the rubber cushioning walls inbetween which interposes or abuts the blade 31, which bends or depresses thereon, in order to provide a tight enclosed box-like chamber for the scrapings, furthermore my scooper attachment may be also adaptable for use upon other similar work, wherever suitable, such as for example, on plaster and paint work, or any other similar work.

Having thus described my invention what I claim as new and desire to secure by Letters Patent, is as follows:

A scooper-attachment for a scraping knife, such as used upon calcimine work or the like, having a box-like member provided with resilient side walls, inbetween which interposes the flaring side edges of said scraping knife, such as a blade provided with a flared out cutting or a scraping edge, said resilient side walls being for the purpose of providing a tight scooping chamber between the box-like member and the scraping knife, when said cutting and scraping edge of the blade bends or depresses under pressure in its scraping operation.

HERMAN STEINHILBER.